(12) United States Patent
Schneider (10) Patent No.: US 7,713,375 B2
(45) Date of Patent: May 11, 2010

(54) DRY ERASE WRITING BOARD AND METHOD

(75) Inventor: Robert W. Schneider, Chardon, OH (US)

(73) Assignee: Avery Dennison Corporation, Pasadena, CA (US)

( * ) Notice: Subject to any disclaimer, the term of this patent is extended or adjusted under 35 U.S.C. 154(b) by 533 days.

(21) Appl. No.: 11/468,808

(22) Filed: Aug. 31, 2006

(65) Prior Publication Data

US 2008/0053610 A1 Mar. 6, 2008

(51) Int. Cl.
B29C 65/00 (2006.01)
B32B 37/00 (2006.01)
B29C 65/48 (2006.01)
B43L 1/00 (2006.01)

(52) U.S. Cl. .................. 156/295; 156/290; 434/408
(58) Field of Classification Search .............. 156/290, 156/295; 434/408
See application file for complete search history.

(56) References Cited

U.S. PATENT DOCUMENTS

| | | | |
|---|---|---|---|
| 3,011,988 A | 12/1961 | Luedke | 260/29.6 |
| 3,340,222 A | 9/1967 | Fang | 260/41 |
| 3,549,463 A | 12/1970 | Frech | 161/2 |
| 3,691,140 A | 9/1972 | Silver | 260/78.5 |
| 3,758,657 A | 9/1973 | Menzin et al. | 264/166 |
| 3,834,823 A | 9/1974 | Seregely et al. | 401/198 |
| 3,846,011 A | 11/1974 | Stein | 350/117 |
| 3,922,457 A | 11/1975 | Barnwell et al. | 428/207 |
| 3,949,132 A | 4/1976 | Seregely et al. | 428/207 |
| 4,123,590 A | 10/1978 | Hasegawa et al. | 428/450 |
| 4,297,260 A | 10/1981 | Ferree, Jr. et al. | 260/29.7 |
| 4,584,356 A | 4/1986 | Crivello | 525/479 |
| 4,650,706 A | 3/1987 | Emmel | 428/40 |
| 4,728,571 A | 3/1988 | Clemens et al. | 428/352 |
| 4,746,576 A | 5/1988 | Ozu et al. | 428/421 |
| 4,804,572 A | 2/1989 | Bodrogi | 428/195 |
| 4,828,502 A | 5/1989 | Leahy | 434/416 |
| 4,885,332 A | 12/1989 | Bilkadi | 524/714 |
| 4,940,628 A | 7/1990 | Lin et al. | 428/207 |
| 4,988,123 A | 1/1991 | Lin et al. | 281/15.1 |

(Continued)

FOREIGN PATENT DOCUMENTS

CA 2390172 5/2001

(Continued)

*Primary Examiner*—Philip C Tucker
*Assistant Examiner*—Michael N Orlando (57) ABSTRACT

This invention relates to a dry erase writing board. The dry erase writing board comprises a chalk or erase board having a face side, and a multilayer film which is adhered to the face side of the chalk or dry erase board. The outer or exposed surface of the multilayer film which is adhered to the chalk board or erase board is a clear dry erasable layer comprising at least one fluorocarbon polymer. The invention also relates to a method of preparing the dry erase writing boards of the invention which utilizes a multilayer film having an adhesive layer for adhering the multilayer film to the chalk or erase board and a pattern of non-adhesive material forms embedded into the upper or lower surface of the adhesive layer, or adhered to the lower surface of the adhesive layer. The dry erasable multilayer films described herein are easily applied to substrates such as a chalk or erase board with little or no formation of visible bubbles or wrinkles in the film.

12 Claims, 2 Drawing Sheets

U.S. PATENT DOCUMENTS

| | | | |
|---|---|---|---|
| 4,996,110 A | 2/1991 | Tanuma et al. | 428/343 |
| 5,037,702 A | 8/1991 | Pitts et al. | 428/423.7 |
| 5,045,569 A | 9/1991 | Delgado | 521/60 |
| 5,104,929 A | 4/1992 | Bilkadi | 524/847 |
| 5,154,962 A | 10/1992 | Mertens et al. | 428/40 |
| 5,200,853 A | 4/1993 | Berkman | 359/443 |
| 5,203,941 A | 4/1993 | Spain et al. | 156/209 |
| 5,207,581 A | 5/1993 | Boyd | 434/412 |
| 5,217,255 A | 6/1993 | Lin et al. | 281/15.1 |
| 5,295,342 A | 3/1994 | Roche et al. | 52/764 |
| 5,300,331 A | 4/1994 | Schaeffer | 427/493 |
| 5,324,764 A | 6/1994 | Fujita et al. | 524/377 |
| 5,342,665 A | 8/1994 | Krawitz | 428/40 |
| 5,349,003 A | 9/1994 | Kato et al. | 524/458 |
| 5,361,164 A | 11/1994 | Steliga | 359/455 |
| 5,387,304 A | 2/1995 | Berner et al. | 156/212 |
| 5,490,956 A | 2/1996 | Kito et al. | 252/583 |
| 5,527,568 A | 6/1996 | Boone et al. | 428/14 |
| 5,534,587 A | 7/1996 | Smith | 524/575 |
| 5,571,617 A | 11/1996 | Cooprider et al. | 428/341 |
| 5,587,408 A | 12/1996 | Burns et al. | 523/160 |
| D377,948 S | 2/1997 | Pruhs | D19/52 |
| 5,626,478 A | 5/1997 | Gatlin | 434/247 |
| 5,682,695 A | 11/1997 | Hoffman | 40/594 |
| 5,688,579 A | 11/1997 | Konsti et al. | 428/192 |
| 5,727,818 A | 3/1998 | Schmeida | 283/81 |
| 5,824,748 A | 10/1998 | Kesti et al. | 525/243 |
| 5,836,038 A | 11/1998 | Thorp | 15/209.1 |
| 5,874,144 A | 2/1999 | Kumar et al. | 428/40.1 |
| 5,947,624 A | 9/1999 | Davignon | 401/202 |
| 6,007,891 A | 12/1999 | Davis et al. | 428/81 |
| 6,067,266 A | 5/2000 | Donelan | 365/218 |
| 6,251,500 B1 | 6/2001 | Varga et al. | 428/195 |
| 6,251,506 B1 | 6/2001 | Davis et al. | 428/213 |
| 6,265,061 B1 | 7/2001 | Kang et al. | 428/323 |
| 6,265,074 B1 | 7/2001 | Shah et al. | 428/413 |
| 6,448,302 B1 | 9/2002 | Dawson et al. | 522/8 |
| 6,458,462 B1 | 10/2002 | Kang et al. | 428/447 |
| 6,476,965 B1 | 11/2002 | He et al. | 359/455 |
| 6,530,664 B2 | 3/2003 | Vanderwerf et al. | 353/74 |
| 6,612,077 B2 | 9/2003 | Parshad | 52/36.5 |
| 6,620,500 B2 | 9/2003 | Sweet et al. | 428/355 |
| 6,630,049 B2 | 10/2003 | Hannington et al. | 156/289 |
| 6,660,352 B2 | 12/2003 | Hsu et al. | 428/40.1 |
| 6,767,591 B2 | 7/2004 | Meccia et al. | 427/508 |
| 6,787,225 B2 | 9/2004 | Dawson et al. | 428/345 |
| 6,878,414 B2 | 4/2005 | Meccia et al. | 427/495 |
| 6,893,266 B2 | 5/2005 | Donelan | 434/408 |
| 6,945,785 B2 | 9/2005 | Sohl et al. | 434/408 |
| 7,060,351 B2 | 6/2006 | Hannington | 428/343 |
| 7,399,184 B2 | 7/2008 | Hester et al. | |
| 2001/0031353 A1* | 10/2001 | Hannington | 428/343 |
| 2001/0051280 A1 | 12/2001 | Callicott et al. | 428/483 |
| 2003/0008095 A1 | 1/2003 | Meccia | 428/40.1 |
| 2003/0026932 A1 | 2/2003 | Johnson et al. | 428/40.1 |
| 2004/0081844 A1 | 4/2004 | Bharti et al. | 428/523 |
| 2004/0091849 A1 | 5/2004 | Gallant et al. | 434/408 |
| 2005/0039847 A1* | 2/2005 | Hannington et al. | 156/240 |
| 2006/0003307 A1 | 1/2006 | Hester et al. | 434/408 |
| 2006/0024461 A1 | 2/2006 | Gustafson et al. | 428/40.1 |
| 2006/0024463 A1 | 2/2006 | Gustafson et al. | 428/40.1 |

FOREIGN PATENT DOCUMENTS

| | | |
|---|---|---|
| JP | 8-169198 | 7/1996 |
| WO | 94/19420 | 9/1994 |
| WO | 99/45079 | 9/1999 |
| WO | 01/36193 | 5/2001 |
| WO | 2004/020221 | 3/2004 |

* cited by examiner

DRY ERASE WRITING BOARD AND METHOD

FIELD OF THE INVENTION

This invention relates to dry erase writing boards. More particularly, the invention relates to dry erase boards which comprise a multilayer film adhered to the face side of a chalk or dry erase board and wherein the multilayer film has a clear, dry erasable layer.

BACKGROUND OF THE INVENTION

Dry erase marking boards are available which may be marked with dry wipe markers, also known as dry erase markers or dry erasable markers. The dry erase marking boards generally comprise a rigid substrate such as a fiber board or metal having a surface coated with a smooth, hard material such as a polymer, enamel, etc. The surface coating is one that is capable of receiving and releasably retaining a marking composition. The marking compositions typically comprise a solvent-based ink which dries to a powder after it has been applied to a surface, and the powder will adhere to the erasable surface for an extended period of time without significantly flaking or otherwise peeling away from the dry erasable writing surface. However, after the ink has dried to a powder, it may be readily wiped off from the dry erasable writing surface with a dry cloth or dry eraser. No solvent is required in the erasing, and hence, these markers are known as "dry wipe" or "dry erasable". These terms are used interchangeably in the present specification and claims.

Dry erase marking boards have a number of advantages over previously employed chalk boards, and the use has steadily increased in recent years. Dry erase marker boards provide a high contrast dark-on-light image, and can be used in combination with various colored inks to produce readable, high contrast displays. Also, dry erase marker boards produce significantly less dust than do chalk boards. The writing surfaces generally are white in appearance and are often referred to as white boards, dry erase boards or dry erasable boards, and these terms are used interchangeably in the specification and claims.

While dry erase marker boards have a number of advantages over chalk boards, over time, the surface of dry erase marker boards often begins to degrade, and the boards tend to retain traces of the marking compositions. This problem is referred to in the industry as "ghosting". While ghosting can be removed, to some degree, by using liquid cleaners, the problem tends to increase over time, and, eventually, the marker board must be replaced.

It has been suggested in the art that dry erase boards can be prepared from films having dry erase characteristics by adhering such films to a solid substrate such as a board with an adhesive. However, one of the difficulties of adhering the films to a solid substrate is the formation of bubbles and wrinkles in the film due to air or moisture trapped under the adhesive film as it is applied to the substrate. Another problem which is encountered is the difficulty of positioning the film with any precision due to the initial strong bond formed by the adhesive on contact with the substrate. It is desirable to be able to reposition, slide, or even remove the film after light application of pressure without destroying the film or the substrate.

SUMMARY OF THE INVENTION

In one embodiment, the invention relates to an improved adhesive layer containing multilayer film having a clear dry erasable surface. The adhesive multilayer film having the dry erasable surface can be utilized as stock material to replace and/or renew the surface of used or old chalk boards and marker boards.

Accordingly, in one embodiment, the present invention relates to a multilayer film comprising
  a) a clear dry erasable layer having an upper surface and a lower surface and comprising at least one fluoropolymer;
  b) an opaque polymer film having an upper surface and a lower surface wherein the upper surface of the opaque polymer film is laminated to the lower surface of the dry erasable layer;
  c) a continuous layer of an adhesive having an upper surface and a lower surface wherein the upper surface of the adhesive layer is adhered to the lower surface of the opaque polymer film; and
  d) a pattern of non-adhesive material forms which is
    d-1) embedded into the upper surface of the adhesive layer, each of said non-adhesive material forms in the upper surface of the adhesive layer having a top surface wherein the top surfaces of the non-adhesive material forms are even with or below the plane of the upper surface of the adhesive layer; or
    d-2) embedded into the lower surface of the adhesive layer, each of said non-adhesive material forms in the lower surface having a bottom surface, wherein the bottom surfaces of the adhesive material forms are either even with, above or below the plane of the lower surface of the adhesive layer; or
    d-3) adhered to the lower surface of the adhesive layer.

These multilayer films having the unique adhesive layer and pattern of non-adhesive material forms can be easily applied to existing chalk boards or marker boards. The pattern of non-adhesive material forms provides a path for fluid egress which allows for easier application of the multilayer film to a chalk board or erase board while minimizing the formation of air bubbles and wrinkles.

In another embodiment, the invention relates to a dry erase writing board comprising
  (A) a chalk or erase board having a face side, and
  (B) a multilayer film comprising
    (B-1) a clear dry erasable layer having an upper surface and a lower surface and comprising at least one fluorocarbon polymer;
    (B-2) an opaque polymer film having an upper surface and a lower surface wherein the upper surface of an opaque polymer film is laminated to the lower surface of the dry erasable layer;
    (B-3) a continuous layer of an adhesive having an upper surface and a lower surface wherein the upper surface of the adhesive layer is adhered to the lower surface of the opaque polymer film; and
    (B-4) a pattern of non-adhesive material forms which is
      (B-4a) embedded into the upper surface of the adhesive layer, each of said non-adhesive material forms in the upper surface of the adhesive layer having a top surface wherein the top surfaces of the non-adhesive material forms are even with or below the plane of the upper surface of the adhesive layer; or
      (B-4b) embedded into the lower surface of the adhesive layer, each of said non-adhesive material forms in the lower surface of the adhesive layer having a bottom surface, wherein the bottom surfaces of the non-adhesive material forms are either even with, above or below the plane of the lower surface of the adhesive layer; or (B-4c) adhered to the lower surface of the adhesive layer; wherein the lower surface of the adhesive layer of the multilayer film (B) is adhered to the face side of the chalk or dry erase board.

In yet another embodiment, the present invention relates to a method of converting a chalk board to a dry erase writing board or of rejuvenating a dry erase writing board surface which comprises (A) providing a chalk board or an erase board having a face side, (B) providing a dry erasable multilayer film comprising
(B-1) a clear dry erasable layer having an upper surface and a lower surface and comprising at least one fluorocarbon polymer;
(B-2) an opaque polymer film having an upper surface and a lower surface wherein the upper surface of an opaque polymer film is laminated to the lower surface of the dry erasable layer;
(B-3) a continuous layer of an adhesive having an upper surface and a lower surface wherein the upper surface of the adhesive layer is adhered to the lower surface of the opaque polymer film; and
(B-4) a pattern of non-adhesive material forms which is
(B-4a) embedded into the upper surface of the adhesive layer, each of said non-adhesive material forms in the upper surface of the adhesive layer having a top surface wherein the top surfaces of the non-adhesive material forms are even with or below the plane of the upper surface of the second adhesive layer; or
(B-4b) embedded into the lower surface of the adhesive layer, each of said non-adhesive material forms in the lower surface of the adhesive layer having a bottom surface, wherein the bottom surfaces of the non-adhesive material forms are either even with, above or below the plane of the lower surface of the adhesive layer; or
(B-4c) adhered to the lower surface of the adhesive layer, and (C) applying the multilayer film to the chalk or dry erase board with the lower surface of the second adhesive layer of the multilayer film in contact with the face side of the chalk or dry erase board.

In other embodiments, the clear dry erasable layer may be laminated to the opaque polymer film utilizing a layer of clear laminating adhesive, and in other embodiments, the upper surface of the opaque polymer film carries discrete markings or areas of colors (indicia) formed by printing the surface of the opaque films before lamination to the clear dry erasable layer.

DESCRIPTION OF THE EMBODIMENTS

The present invention, in one embodiment, relates to the discovery that adhesive layer containing multilayer films having a clear dry erasable surface can be utilized to convert a chalk board to a dry erase writing board or to rejuvenate an erase writing board. The multilayer films utilized in the present invention are adhesive containing films having improved application performance with regard to fluid egress during application of the multilayer film to a black board or dry erase board. The multilayer films utilized in the present invention may optionally also have improved application performance with regard to repositionability and slideability.

In one embodiment, the dry erase writing boards of the present invention comprise
(A) a chalk or erase board having a face side, and
(B) a multilayer film comprising
(B-1) a clear dry erasable layer having an upper surface and a lower surface and comprising at least one fluorocarbon polymer;
(B-2) an opaque polymer film having an upper surface and a lower surface wherein the upper surface of an opaque polymer film is laminated to the lower surface of the dry erasable layer;
(B-3) a continuous layer of an adhesive having an upper surface and a lower surface wherein the upper surface of the adhesive layer is adhered to the lower surface of the opaque polymer film; and
(B-4) a pattern of non-adhesive material forms which is
(B-4a) embedded into the upper surface of the adhesive layer, each of said non-adhesive material forms in the upper surface of the adhesive layer having a top surface wherein the top surfaces of the non-adhesive material forms are even with or below the plane of the upper surface of the adhesive layer; or
(B-4b) embedded into the lower surface of the adhesive layer, each of said non-adhesive material forms in the lower surface of the adhesive layer having a bottom surface, wherein the bottom surfaces of the non-adhesive material forms are either even with, above or below the plane of the lower surface of the adhesive layer; or
(B-4c) adhered to the lower surface of the adhesive layer; wherein the lower surface of the adhesive layer of the multilayer film (B) is adhered to the face side of the chalk or dry erase board.

In another embodiment of the invention, the dry erase writing boards of the present invention are prepared in a process which comprises
(A) providing a chalk board or an erase board having a face side,
(B) providing a dry erasable multilayer film comprising
(B-1) a clear dry erasable layer having an upper surface and a lower surface and comprising at least one fluorocarbon polymer;
(B-2) an opaque polymer film having an upper surface and a lower surface wherein the upper surface of an opaque polymer film is laminated to the lower surface of the dry erasable layer;

(B-3) a continuous layer of an adhesive having an upper surface and a lower surface wherein the upper surface of the adhesive layer is adhered to the lower surface of the opaque polymer film; and (B-4) a pattern of non-adhesive material forms which is
- (B-4a) embedded into the upper surface of the adhesive layer, each of said non-adhesive material forms in the upper surface of the adhesive layer having a top surface wherein the top surfaces of the non-adhesive material forms are even with or below the plane of the upper surface of the second adhesive layer; or
- (B-4b) embedded into the lower surface of the adhesive layer, each of said non-adhesive material forms in the lower surface of the adhesive layer having a bottom surface, wherein the bottom surfaces of the non-adhesive material forms are either even with, above or below the plane of the lower surface of the adhesive layer; or
- (B-4c) adhered to the lower surface of the adhesive layer, and (C) applying the multilayer film to the chalk or dry erase board with the lower surface of the second adhesive layer of the multilayer film in contact with the face side of the chalk or erase board.

The chalk boards utilized in the present invention may be those commonly found in classrooms and conference rooms which may be made of slate or other surface materials which can be written upon with chalk. The erase boards which can be rejuvenated and coated with the multilayer films described herein include wet erase boards having surfaces where markers are used but the markings can only be removed by application of solvents such as water, or an organic solvent such as mineral spirits. The erase boards which can be recovered with the multilayer films of the present invention also include dry erase boards. Accordingly, the present invention contemplates the application of the dry erasable multilayer films described therein over the face side of various chalk boards and erase boards to provide dry erase writing boards having excellent dry erase characteristics. The chalk boards and erase boards which can be covered with the dry erasable multilayer films described herein can be of any size and shape since the multilayer films can be prepared in roll form of varying lengths and widths including lengths up to about 100 feet and widths from one up to about 4 or 5 feet.

As noted above, the multilayer films comprise a clear dry erasable layer having an upper surface and a lower surface, and the clear dry erasable layer comprises at least one fluorocarbon polymer which is dry wipeable. That is, a solvent-based ink, capable of drying to a powder after it has been applied to the surface can be removed by wiping with a dry eraser or cloth. After the ink dries, the ink will adhere to the dry erasable writing surface for a long period of time without significant degradation but can readily and easily be removed by simple wiping. As noted, the dry erasable layer is clear or optically transparent. That is, it is possible to see through the dry erase layer, and any markings or indicia on the face of the opaque layer can be seen through the outer surface of the dry erase layer. In some embodiments, it is desirable to reduce the gloss of the dry erase film. Thus, for example, a matte finish can be applied to the surface of the dry erasable layer, non-glare additives can be incorporated into the fluorocarbon polymer used to prepare the dry erasable layer, and/or the surfaces can be evenly embossed to reduce reflectance.

A number of different fluorocarbons polymers are known and available commercially and which can be utilized as the dry erase layer of the multilayer film utilized in the present invention. Examples of fluorocarbon polymers include polymers and copolymers which contain one or more polymerized monomers such as tetrafluoroethylene (TFE), chlorotrifluoroethylene (CTFE), vinyl fluoride (VF), vinylidene fluoride (VDF). Specific examples of useful fluorocarbon polymers include polytetrafluoroethylene (PTFE). Useful copolymers include FEP which is a thermoplastic copolymer of tetrafluoroethylene and hexafluoropropylene, ETFE which is a thermoplastic copolymer of ethylene and tetrafluoroethylene, ECTFE which is a copolymer of ethylene and chlorotrifluoroethylene.

Specific examples of useful fluorocarbon polymers include Norton ETFE fluoropolymer film from Saint-Gobain Performance Plastics, Tefzel ETFE, Teflon PTFE, Teflon FEP and Teflon PFA fluoropolymer resins from DuPont; Aclar (from Allied Signal Corp.) believed to be a chlorotrifluoroethylene copolymer; Korton-K 720 (available from Norton-Allied) believed to be a polyvinylidene chloride polymer; and Kynar 730 (available from Autochem North America) believed to be a polyvinylidene chloride homopolymer.

The thickness of the clear dry erasable layer of fluorocarbon polymer can vary widely provided the multilayer film remains flexible. In one embodiment, the thickness of the fluorocarbon polymer layer may range from about 0.2 to about 2 or 3 mils. In another embodiment, the thickness of the fluorocarbon polymer layer is in the range of from about 0.5 to about 2 mils.

In the multilayer films utilized in the present invention, the dry erasable layer of fluorocarbon polymer is laminated to the upper surface of an opaque polymer film. In one embodiment, the dry erasable layer of fluorocarbon polymer is extruded onto a continuous sheet of the opaque polymer film. In another embodiment, preformed sheets of fluorocarbon polymer film can be adhesively laminated to the opaque polymer film layer. Adhesives which are capable of bonding fluoropolymers to other surfaces are known and commercially available. Examples of useful laminating adhesives include acrylic adhesives, and in one embodiment, solvent based acrylic polymers and copolymers. Specific examples of useful solvent acrylics include adhesive S652 from Avery Dennison Performance Polymers, Cleveland, Ohio and S4001 from Ashland Chemicals, Columbus, Ohio.

The amount of laminating adhesive used to laminate the clear dry erase layer to the opaque layer can be varied. In one embodiment, coating weights in the range of from about 10 to about 30 gsm are utilized. In other embodiments, from about 15 to about 25 gsm are useful.

The bonding strength between the fluorocarbon polymer and the opaque polymer film layer may be enhanced by treating the surface of either the fluorocarbon polymer layer and/or the opaque polymer film layer. Corona discharge and other treatment techniques are well known in the art for enhancing the bonding strength of fluorocarbon polymers and other polymer films to substrates. Any of these techniques can be used to increase the bonding strength of the dry erasable layer to the opaque polymer film layer.

The opaque polymer film layer of the multilayer films utilized in the present invention provides a light reflecting layer (contrast) for any indicia written on the dry erase surface. The opaque polymer film layer generally will contain pigments to provide the desired color. Thus, the opaque layer may be white, off white or of a light color which will provide the desired contrast for any writing on the dry erase surface. In one embodiment, the opaque layer is white or off white.

A variety of thermoplastic polymers can be utilized to form the opaque polymer film, and such materials include polyolefins, polyamides, polystyrenes, nylon, polyesters, polyurethanes, polysulfones, polyvinylchloride, styrene-maleic anhydride copolymers, acrylic polymers and copolymers, polycarbonates, polyacrylonitriles, and ethylene-vinyl acetate copolymers. Films prepared from blends of copolymers or blends of homopolymers and copolymers also are useful.

In one embodiment, the thermoplastic polymers utilized in the opaque polymer films include polyvinyl chlorides. Useful calendared polyvinyl chloride films are available commercially such as from Spartech Plastics, Salisbury, Md.

Various pigments can be used to prepare the opaque polymer films. Pigment concentrates (in a resin carrier) can be added to the polymers prior to formation of the films. The concentrate may contain, for example, about 20% to about 80% by weight pigment, and about 20% to about 80% by weight resin carrier. The resin carrier can be any thermoplastic polymer having a melting point in the range of about 100° C. to about 175EC. Examples include polyethylene, polypropylene, polybutylene, and the like. In one embodiment, a titanium dioxide concentrate is used which is comprised of a blend of about 30% to about 70% by weight polypropylene and about 70% to about 30% by weight titanium dioxide. An example of a commercially available pigment concentrate that can be used is available from A. Schulman Inc. under the tradename Polybatch White P8555 SD, which is identified as a white color concentrate having a coated rutile titanium dioxide concentration of 50% by weight in a polypropylene homopolymer carrier resin. Ampacet LR-87132 Orange PE MB, which is a product of Ampacet Corporation identified as a lead molybdate/lead chromate pigment concentrate, can be used. The heavy-metal free pigment concentrates that can be used include Ampacet LR-86813 Yellow UV PE MB. The concentration of pigment in the opaque layer can be up to about 25% by weight, and in one embodiment about 5% to about 25% by weight, and in one embodiment about 10% to about 20% by weight.

The thickness of the opaque polymer film layer may be varied over a wide range. In one embodiment, the thickness ranges from about 1 to about 6 mils. In another embodiment, the opaque polymer film layer is from about 3.5 to about 4 mils thick.

As noted above, the multilayer films utilized in the present invention also contain a continuous layer of an adhesive having an upper surface and a lower surface wherein the upper surface of the adhesive layer is adhered to the lower surface of the opaque polymer film. The adhesive layer may have a thickness of from about 0.5 to about 5 mils or from about 1 to about 3 mils. In one embodiment, the coat weight of the adhesive is from about 25 to about 50 gsm.

In one embodiment, the adhesive layer comprises any suitable adhesive including pressure-sensitive adhesives (PSAs) and heat activated adhesives. Useful PSAs include rubber based adhesives, acrylic adhesives, vinyl ether adhesives, silicone adhesives, and mixtures of two or more thereof. Also included are the pressure sensitive adhesive materials described in *Adhesion and Bonding*, Encyclopedia of Polymer Science and Engineering, Volume 1, pages 476-546, Interscience Publishers, Second Ed. 1985, the disclosure of which is hereby incorporated by reference. Some of the above-referenced suitable pressure sensitive adhesive materials contain as a major constituent, resin-based materials such as acrylic type polymers, block copolymers, natural, reclaimed or styrene-butadiene rubbers, tackified natural or synthetic rubbers, random copolymers of ethylene and vinyl acetate, ethylene-vinyl-acrylic terpolymers, polyisobutylene, poly(vinylether), etc.

Other materials in addition to the foregoing resins may be included in the pressure sensitive adhesives. These include solid tackifying resins, liquid tackifiers (also referred to as plasticizers), antioxidants, fillers, pigments, waxes, etc. The adhesive materials may contain a blend of solid tackifier resins and liquid tackifier resins (or liquid plasticizers).

Useful techniques which are known in the art for applying the continuous adhesive layer to the opaque polymer film include curtain coating, gravure coating, reverse gravure coating, offset gravure coating, roller coating, brushing, knife-over roll coating, metering rod coating, reverse roll coating, doctor knife coating, dipping, die coating, spraying, and other similar methods. In one embodiment, the adhesive is applied to the opaque polymer film by laminating an adhesive layer that is removably adhered to a release liner or carrier layer.

In one embodiment, the multilayer films utilized in the present invention may also comprise a release liner prior to application of the multilayer film to the face surface of a chalk board or erase board. Release liners useful in the present invention include those known in the art. In one embodiment, useful release liners include polyethylene coated papers with a silicone release coating, polyethylene coated terephthalate films with a silicone release coating, or cast polypropylene films that can be embossed with a pattern or patterns while making such films, thereafter coated with a silicone release coating. The release liner may be selected for its release characteristics relative to the pressure sensitive adhesive chosen for use in the multilayer films. In one embodiment, the surface of the release liner may have a textured finish, a smooth finish, or a patterned finish. The release layer may have a randomly microstructured surface such as a matte finish, or have a pattern of three-dimensional microstructures. The microstructures may have a cross section which is made up of circles, ovals, diamonds, squares, rectangles, triangles, polygons, lines, or irregular shapes, when the cross section is taken parallel to the surface of the release surface.

In one embodiment, the second surface of the adhesive layer has a Sheffield roughness of at least about 10, or at least about 75 or at least about 150. The second surface of the adhesive layer may itself have the indicated roughness or the rough surface may be formed when the adhesive is coated onto a release liner. It is understood that the surface of the release liner may have a Sheffield roughness of at least about 10, or at least about 50, or at least about 75, or at least about 150. The adhesive will replicate the complementary texture or pattern of the release liner. The Sheffield roughness is determined by TAPPI T 538 om-88.

The multilayer films utilized in the present invention also contain a pattern of non-adhesive material forms which are embedded into the upper surface of the adhesive layer, embedded into the lower surface of the adhesive layer, or adhered to the lower surface of the adhesive layer. As noted above, in one embodiment, the pattern of non-adhesive material forms are embedded into the upper surface of the adhesive layer, and each of said non-adhesive material forms in the upper surface of the adhesive layer has a top surface wherein the top surfaces of the non-adhesive material forms are even with or below the plane of the upper surface of the adhesive layer. In another embodiment, the pattern of non-adhesive material forms is embedded into the lower surface of the adhesive layer, and each of said non-adhesive material forms in the lower surface of the adhesive layer have a bottom surface, wherein the bottom surfaces of the non-adhesive material forms are either even with, above or below the plane of the lower surface of the adhesive layer. In yet another embodiment, the pattern of non-adhesive material forms is adhered to the lower surface of the adhesive layer.

In one embodiment, the non-adhesive material includes non-adhesive polymers, including ink compositions applied by printing methods. In another embodiment, the non-adhesive material is applied by vacuum metallization or by sputtering. The non-adhesive material, after drying, cooling, and/or curing, adheres to the upper or lower surface of the adhesive layer. In one embodiment, the non-adhesive composition contains greater than 50%, or greater than 75%, or greater than 85% solids. In another embodiment, the non-adhesive composition is 100% solids.

In one embodiment, the non-adhesive material can be any material that can be used as the ink on a printing machine, provided that upon drying, cooling, and/or curing, the non-adhesive material is not tacky. The non-adhesive material may be made of organic polymeric material such as polyurethane, polyvinyl chloride, acrylic polymers, acetate, polyethylene, polypropylene or polystyrene and the like.

In one embodiment, the non-adhesive composition is a UV curable ink. The ultraviolet radiation curable inks useful in the invention generally comprise a binder which comprises one or more photopolymerizable monomers. The photopolymerizable monomers generally are ethylenically unsaturated compounds. The unsaturated compounds may contain one or more olefinic double bonds, and they may be low molecular weight compounds, (monomeric) or high molecular weight compounds (oligomeric). Illustrative examples of monomers containing one double bond are acrylates such as alkyl(meth) acrylates or hydroxyalkyl(meth)acrylates such as methyl-, ethyl -, butyl-, 2-ethylhexyl-or 2-hydroxyethylacrylate, isobornylacrylate, methyl-or ethylmethacrylate. Further examples of photopolymerizable monomers are acrylonitrile, acrylamide, methacrylamide, N-substituted (meth) acrylamides, vinyl esters such as vinyl acetate, vinyl ethers such as isobutylvinyl ether, styrene, alkylstyrenes and halostyrenes, N-vinylpyrrolidone, vinyl chloride or vinylidene chloride.

Monomers containing a plurality of double bonds are typically the diacrylates of ethylene glycol, 1,3-propylene glycol, 1,4-butaneodiol, 1,4-cyclohexane diol, neopentyl glycol, hexamethylene glycol, or bisphenol A polyacrylates such as trimethylolpropane triacrylate and pentaerythritol triacrylate or tetraacrylate, vinyl acrylate, divinyl benzene, divinyl succinate, diallyl phthalate, triallylphosphate, triallylisocyanurate or tris(2-acryloyloxy)ethyl-isocyanurate.

Typical examples of high molecular weight (oligomeric) polyunsaturated compounds are acrylated epoxy resins, acrylated polyethers, acrylated polyurethanes or acrylated polyesters. Further examples of unsaturated oligomers are unsaturated polyester resins which are normally prepared from maleic acid, phthalic acid and one or more diols and which have molecular weights of about 500 to about 3000. Such unsaturated oligomers may also be referred to as prepolymers. Single component systems based on photocurable prepolymers are often used as binders for printing inks. Unsaturated polyester resins are normally used in two-component systems together with a monounsaturated monomer such as described above, preferably with styrene.

The unsaturated compounds also can be used in admixture with non-photopolymerisable film-forming components. These components may typically be drying polymers or their solutions in organic solvents, such as nitrocellulose. They may also, however, be chemically curable or thermocurable resins such as polyisocyanates, polyepoxides or melamine resins. The concomitant use of thermocurable resins is important for use in so-called hybrid systems which are photopolymerised in a first step and crosslinked by a thermal after treatment in a second step.

The UV radiation curable inks also should contain at least one photoinitiator. A wide range of different photoinitiators is at present available for UV radiation curable systems. They include benzophenone and benzophenone derivatives, benzoin ethers, benzil ketals, dialkoxyacetophenones, hydroxyacetophenones, aminoacetophenones, haloacetophenones or acryloxyphosphine oxides. They differ in that they have different absorption maxima. To cover a wide absorption range it is possible to use a mixture of two or more photoinitiators. The total amount of photoinitiator in the UV radiation curable compositions may be in the range of from about 0.05 to about 7, or 10% by weight of the total composition. Preferably the compositions contain from about 0.2% to about 5% by weight of the photoinitiator.

Amines may be added to accelerate the photopolymerisation, for example triethanolamine, N-methyl-diethanolamine, p-dimethylaminobenzoate or Michler's ketone. The photopolymerisation can further be accelerated by the addition of photosensitisers which displace or broaden the spectral sensitivity. These photosensitisers are preferably aromatic carbonyl compounds such as thioxanthone, anthraquinone and 3-acyl-coumarin derivatives as well as 3-(aroylmethylene) -thiazolines.

Hindered amine light stabilizers (HALS) which function as co-stabilizers, also may be added to the UV radiation curable printing compositions used in the present invention. Examples of hindered amine light stabilizers include those listed and recited in U.S. Pat. Nos. 5,112,890 and 4,636,408, which are incorporated herein by reference. A specific example of a hinder amine light stabilizer useful in the printing inks is Tinuvin 292 which is identified as bis(1,2,2,6,6-pentamethyl-4-piperidinyl)sebacate.

In addition to the above described binder materials and photoinitiators, the UV radiation curable inks may also contain coloring matter selected from organic pigments, inorganic pigments, body pigments and dyes which are known and have been used in this art. Examples of useful pigments include titanium dioxide, cadmium yellow, cadmium red, cadmium maroon, black iron oxide, carbon black, chrome green, gold, silver, aluminum and copper. Examples of dyes include alizarine red, Prussian blue, auramin naphthol, malachite green, etc. Generally the concentration of the pigment or dye in the ink will be from about 0 to about 70% by weight, and in one embodiment, from about 0.1% to about 50% by weight.

In addition to the above described coloring matter, the UV radiation curable inks used in the present invention may also contain fillers, extenders, surfactants, and the like which are known and have been used in this art. Examples of useful fillers and extenders include silicon dioxide, fumed silica, glass or ceramic microspheres, and glass or ceramic bubbles. Generally the concentration of the filler or extender will be from about 0 to about 70% by weight, and in one embodiment, from about 0.5% to about 50% by weight.

The printing inks may also contain at least one UV absorber which provides weathering protection and helps prevent microcracking. The amount of UV absorber included in the UV radiation curable ink should be maintained at a practical minimum since the presence of the UV absorber may increase the curing rate. A variety of UV absorbers are known and useful in the present invention and these include UV absorbers belonging to the group of photopolymerisable hydroxybenzophenones and photopolymerisable benzotriazoles. U.S. Pat. No. 5,369,140 describes a class of 2-hydroxyphenyl-s-triazines that are useful as UV absorbers for radiation curable systems. The triazines are effective for stabilizing cured films when exposed to sunlight over a long period of time, and these stabilizers do not interfere with UV radiation curing of the inks. The triazine UV absorbers are effective in amounts of from about 0.1 to about 2% by weight. The UV absorbers may be used in combination with other light stabilizers such as sterically hindered amines. The disclosure of the '140 patent is hereby incorporated by reference for its disclosure of such UV absorber combinations. U.S. Pat. Nos. 5,559,163 and 5,162,390 also describe UV absorbers which are useful in the inks of the present invention.

Examples of useful UV curable inks include those available from Decochem under the trade designation Poly-Rad plastics, as well as UV curable inks commercially available from Acheson and Daw Chemical Company. In one embodiment of the invention, the ink used to form the non-adhesive material on the adhesive layer is a coalescing ink. The ink does not efficiently wet out on the surface of the adhesive, but coalesces into smaller areas of ink with an increase in height. Thus, depending on the degree of coalescence, a line of printed ink can form a narrower line, or a line made up of what appear to be random small beads of ink, or a combination, all with an increase in height. The narrower line, small beads, or combination are then embedded into the adhesive. The thickness of the ink applied to the surface of the adhesive layer can also affect the degree of coalescence. Surfactants may be added to the ink composition to control the degree of coalescence as well.

In one embodiment of the invention, the ink used to form the non-adhesive material comprises a porous non-adhesive. The porous non-adhesive may have elastomeric properties, so that if it is compressed, it essentially returns to its original shape. For example the porous non-adhesive comprises an ink containing a blowing agent that causes the ink to expand, forming an open or closed cell, or combination thereof. The blowing agent is activated, for example, by the application of heat to the ink. Other examples of porous non-adhesives include suspensions of gas and/or particles in a binder. The porous non-adhesive is then embedded into the adhesive layer. The porous non-adhesive fills the depression created in the embedding step, resulting in a facestock layer having a smooth outer appearance.

The non-adhesive material forms are generally present in a pattern. The pattern can be a plurality of dots, lines, or any geometric figure, that provides a path for fluid egress from the adhesive article. When lines are used, at least about 50% of the pattern should extend to the edge of the adhesive article to obtain acceptable fluid egress. This pattern provides a path to an end edge which facilitates egress of fluids such as air or water. The lines and dots may vary in size provided that fluid egress is maintained. The lines and other patterns generally have an average thickness from about $0.3\mu$ to about $100\mu$, or from about $0.5\mu$ to about $50\mu$, or from about $2\mu$ to about $20\mu$. The width of the lines may also vary widely. An example of a useful range for line width is from about $12\mu$ to about $250\mu$, or from about $25\mu$ to about $125\mu$, or from about $50\mu$ to about $75\mu$. The pattern may be a grid of intersecting lines, a weave pattern, a waffle pattern, diagonal straight and curved lines, tiled geometric figures, such as hexagons, rectangles, overlapping circles or triangles, or lines in a cross hatch pattern. Combinations of patterns may be used such as a grid of intersecting lines with random or patterned dots. The non-adhesive material may be applied by any means.

In one embodiment, the non-adhesive material is an ink comprising a UV curable polymer composition, such as a UV curable acrylic or polyurethane composition. After application, the ink is cured by irradiation in a UV exposure apparatus as is well known to those skilled in the art of printing and UV curing. UV light sources such as low pressure mercury lamps, high pressure mercury lamps, xenon lamps, arc lamps and gallium lamps are useful. It is also possible, but not necessary, to improve the curability of the ink by heating after irradiation.

In one embodiment, the non-adhesive material is a polymer composition which is able to be printed by any suitable printing technique such as screen printing, roller coat printing, flexographic printing, lithographic printing, gravure printing, laser printing, ink jet printing, brushing, spraying, dipping or coating. The type of printing may be any type which can print on the pressure sensitive adhesive. One particularly useful printing method is a modification of flexographic printing which provides both the printing and embedding of the (when desired) non-adhesive material.

In one embodiment, the non-adhesive layer is a printing ink having a thickness from about 0.3 to about 100 microns, from about 0.5 to about 50 microns, or from about 2 to about 20 microns. The non-adhesive material may also be applied to the pressure sensitive adhesive by means of patterned vacuum metallization or sputtering. In this embodiment, the non-adhesive layer typically has a thickness from about 30 to about 3000, from about 100 to about 2000, or from about 300 to about 1500 nanometers.

In one embodiment, indicia is provided on the front or upper face of the opaque polymer film by printing in a conventional manner prior to lamination of the opaque polymer film to the dry erasable layer. The colors of the indicia are different from the color of the opaque polymer film so that the indicia can be seen through the clear dry erase layer. Different indicia having different colors which produce a multi-color design can be utilized. The designs which can be formed by the indicia can be varied depending on the end use of the dry erase film. Thus, the indicia may be letters, numbers, outlines of information or information for specific uses such as lines, rulers, graphs, maps, etc. Alternatively, the design may be random to provide a decorative or soothing background.

Figure 1A:
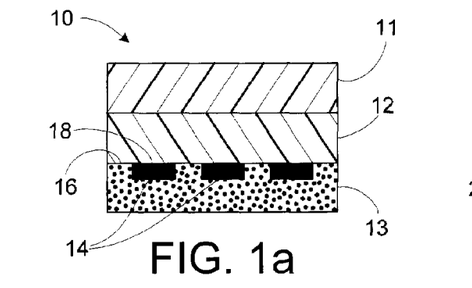
FIGS. 1a and 1b are cross sectional areas of multilayer films utilized in the present invention wherein non-adhesive material is embedded in the adhesive layer.

The multilayer films which are useful in the present invention are further described by referring to the figures. FIG. 1*a* represents a cross section of an adhesive layer containing multilayer film 10. The multilayer film 10 includes the dry erasable layer 11 having an upper surface and a lower surface, an opaque layer 12 having an upper surface and a lower surface wherein the upper surface of the opaque layer 12 is adhered to the lower surface of dry erase layer 11, and an adhesive layer 13 wherein the upper surface of the adhesive layer 13 is in contact with the lower surface of the opaque layer 12. Non-adhesive material form 14 is in adhesive contact with the adhesive layer 13, and the non-adhesive material 16 is fully embedded into the surface 16 of adhesive layer 13. The top surfaces 18 of the non-adhesive material 14 in the embodiment illustrated in FIG. 1*a* are even with the plane of upper surface 16 of adhesive layer 13.

Figure 1B:
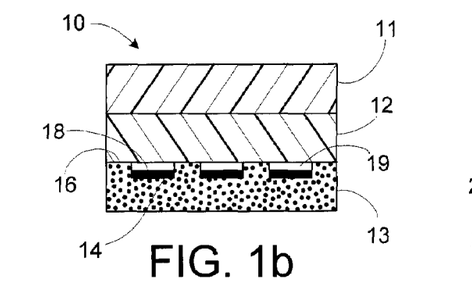

In another embodiment of the multilayer films used in the present invention as represented by FIG. 1*b*, the multilayer film 10 is similar in construction to the film of FIG. 1*a* except the top surface 18 of the non-adhesive material 14 is below the upper surface 16 of the adhesive layer 13 leaving channels 19 with most of the non-adhesive material in the bottom of the channels.

The adhesive layers 13 of FIGS. 1*a* and 1*b* having the non-adhesive material forms 14 embedded therein can be prepared by printing and embedding a pattern of non-adhesive areas 14 into the surface of an adhesive layer 13 on a release liner. Using flexographic printing techniques, a pattern such as diamonds, is printed into the exposed surface of the adhesive layer 13. The non-adhesive material 14 is a non-adhesive resin which upon drying, cooling and/or curing maintains its shape. The printing technique embeds the print into the soft surface of the adhesive whereby the top surface 18 of the non-adhesive material 14 is either even with the upper surface 16 of the adhesive layer 13 (FIG. 1a) or the top surface 18 of the non-adhesive material 14 is below the upper surface 16 of the adhesive layer 13 (FIG. 1b).

Figure 2A:
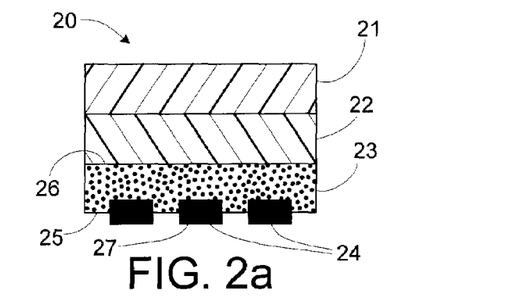
FIGS. 2a, 2b and 2c and 2d are cross sectional areas of a multilayer film useful in the present invention wherein the non-adhesive material is embedded into the lower surface of the adhesive layer.
Figure 2B:
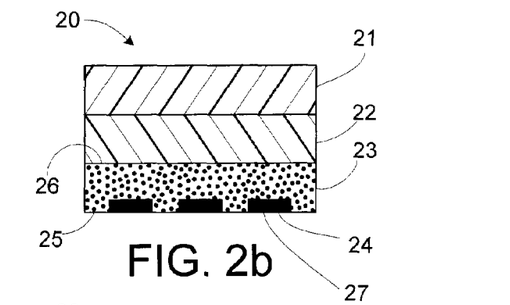
Figure 2C:
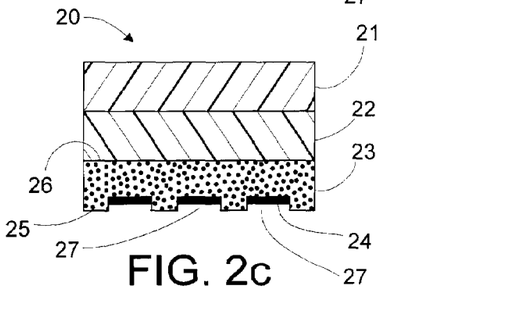

In other embodiments of the multilayer films useful in the present invention, the non-adhesive material forms are embedded into the lower surface of the adhesive layer, and the bottom surface of the non-adhesive material forms are either even with, above or below the plane of the lower surface of the adhesive layer. These embodiments are illustrated in FIGS. 2a, 2b and 2c. In the embodiment illustrated in FIG. 2a, the non-adhesive material forms 24 are partially embedded into the lower surface of the adhesive layer 23, and the bottom surface 27 of the non-adhesive material is below the plane of the lower surface 25 of adhesive layer 23. In FIG. 2a, the upper surface of the adhesive layer 23 is in adhesive contact with the lower surface of opaque polymer film layer 22 which, in turn, is in contact with the lower surface of the clear dry erase layer 21.

In FIG. 2b, the multilayer film 20 comprises dry erase layer 21, opaque polymer film layer 22 in contact with the lower surface of the dry erase layer 21, and adhesive layer 23 wherein the upper surface 26 of adhesive layer 23 is in contact with the lower surface of the opaque layer 22. In the embodiment illustrated in FIG. 2b, the non-adhesive material form 24 is fully embedded into the adhesive layer 23, and the bottom surface 27 of the non-adhesive material 24 is even with the plane of the lower surface 25 of adhesive layer 23.

The embodiment illustrated in FIG. 2c is similar to the embodiment in FIGS. 2a and 2b except that the bottom surface of the non-adhesive material form is above the plane of the bottom surfaces leaving channels 29 with most of the non-adhesive material on the bottom of the channels.

The non-adhesive material forms 24 in the multilayer films illustrated in FIGS. 2a, 2b and 2c can be embedded into the lower surface of the adhesive layer 23 by various techniques known in the art. For example, embedding may be carried out using pressure and/or heated rollers or a platen, whereby the non-adhesive material is pressed into the adhesive layer. Alternatively, the non-adhesive material may be embedded into the adhesive layer by winding the article so that the patterned lower surface of the adhesive is in contact with the front (upper surface) of the multilayer film. It is to be understood that at least a major amount of the non-adhesive material is embedded within adhesive layer 23. Embedding of the non-adhesive material into the adhesive typically occurs at a temperature of from about 20° C. to about 95° C. or from about 45° to about 65° C. The pressure for embedding the non-adhesive material into the adhesive is typically between about 15 to about 100 psi, or from about 25 to about 50 psi. Alternatively, the non-adhesive material may be embedded into the adhesive layer by applying pressure with another layer, such as a release liner or facestock layer onto the non-adhesive pattern surface of the adhesive layer. As noted above, in one embodiment, the non-adhesive material is embedded sufficiently into the adhesive layer whereby the bottom surface of the non-adhesive material is even with, above or below the plane of the lower surface of the adhesive layer.

Figures 2D, 3:
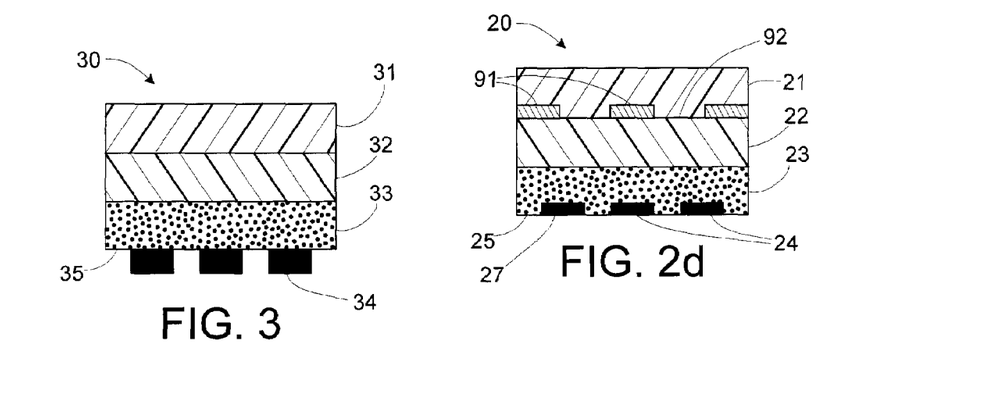
FIG. 3 is a cross sectional area of another multilayer film useful in the present invention wherein the non-adhesive material is adhered to the lower surface of the adhesive layer.

FIG. 2d illustrates another embodiment of the multilayer films useful in the present invention, and, in particular, illustrates another embodiment of the multilayer film illustrated in FIG. 2b. In the embodiment of FIG. 2d indicia 91 has been printed on the upper surface 92 of opaque layer 22. The indicia is printed on the upper surface 92 of opaque polymer film 22 prior to lamination of the dry erasable layer 21 to the opaque layer.

Another embodiment of the multilayer films useful in the present invention is illustrated in FIG. 3 wherein the multilayer film 30 comprises dry erase layer 31, opaque polymer film layer 32, adhesive layer 33 and non-adhesive material forms 34. In this embodiment, the non-adhesive material 34 is adhered to the lower surface 35 of adhesive layer 33.

The layer of adhesive 33 having non-adhesive material forms 34 adhered to the lower surface 35 of the adhesive layer can be prepared by a variety of techniques known to those skilled in the art. In one embodiment of the present invention, such structures can be prepared by applying a non-adhesive material to the release coating of a release liner. The non-adhesive material may be fully or partially embedded into the release liner using pressure and/or heated rollers or a platen, whereby the non-adhesive material is pressed into the release coating of the release liner. It should be noted that the release liner has a moldable layer of polymer under the release coating, which softens upon application of heat, allowing the non-adhesive material to be embedded into the liner. The moldable layer is typically a polyolefin such as polyethylene or polypropylene.

Embedding temperatures depend on the materials used, but typically are in the range of from about 65° to about 150° C. for embedding into the release liner. The embedding pressure also is material independent and is typically between about 25 to about 150 pounds per square inch (psi).

After embedding the non-adhesive material 34 into the release liner, the liner is coated with an adhesive layer 33, and following drying, cooling, and/or curing of the adhesive, the adhesive layer is brought into adhesive contact with the lower surface of opaque layer 32. Because of the release characteristics of the release liner, the strength of the adhesive bond of the non-adhesive material 34 to the adhesive layer 33 is greater than the strength of the adhesive bond to the release liner. Thus, when release liner is removed from the adhesive layer 33, the non-adhesive material 34 adheres to the lower surface 35 of adhesive layer 33.

Figure 4:
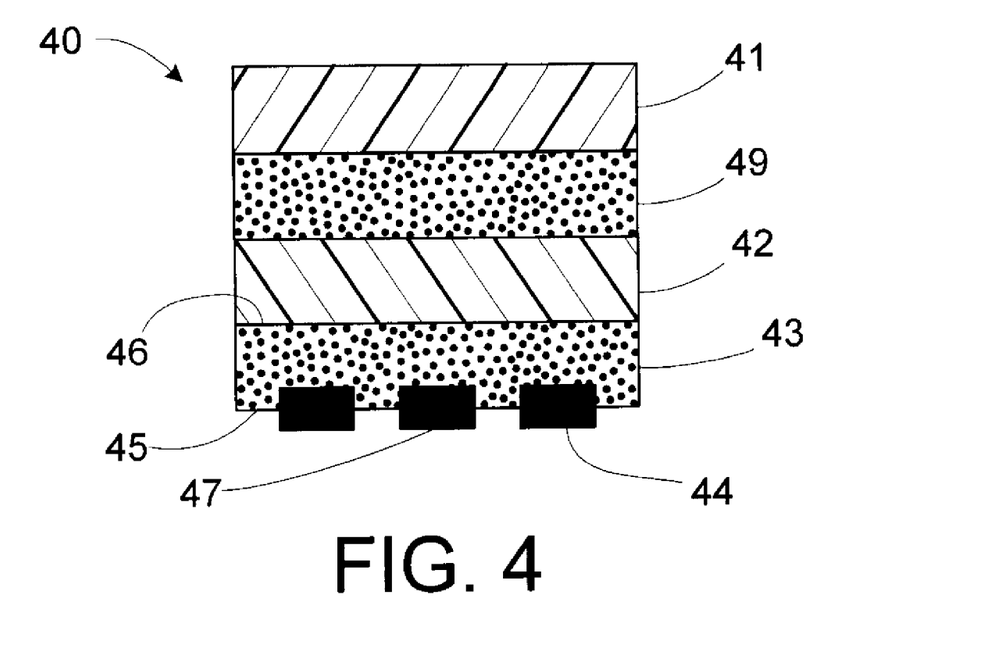
FIG. 4 is a cross sectional area of another multilayer film useful in the present invention wherein the erasable layer is laminated to the opaque layer with a laminating adhesive.

FIG. 4 illustrates another embodiment of the multilayer films of the present invention. As can be noted, the multilayer film of FIG. 4 differs from the multilayer film of FIG. 2A in that a laminating adhesive layer 49 is present between the lower surface of the dry erase film layer 41 and the upper surface of opaque polymer layer 42. As described above, the laminating adhesive layer 49 improves the adhesion between the dry erase film layer 41 and the opaque polymer film layer 42.

The dry erase writing boards in the present invention comprise a chalk or erase board having a face side, and the multilayer films described above wherein the lower surface of the adhesive layer is adhered to the face side of the chalk or dry erase board. The use of the multilayer films as described above increases the ease with which the multilayer films can be applied to and adhered to chalk boards and erase boards while minimizing the formation of bubbles and wrinkles in the film after application. A reduction in the formation of bubbles and wrinkles is the result of the improved fluid egress which is obtained as the result of the presence of the non-adhesive material forms either on or in the adhesive layer. Fluid egress is defined as the ability of the product to provide a route or path for removal of air and moisture which is trapped under the product. When the non-adhesive material form is embedded to a level even with the plane of the adhesive layer, the non-adhesive material provides fluid egress along the interface. This is particularly true for the smaller bubbles which form as the natural result of laying the adhesive construction onto a chalk board or erase board. Even when applied properly, small bubbles are still formed, and these bubbles need a route to egress. The interface of the non-adhesive material and the substrate is the area where this occurs. When the non-adhesive material extends beyond the adhesive layer, the non-adhesive material provides repositionability and/or slideability as well as fluid egress. This is of particular advantage when applying the adhesive multilayer film to a chalk or erase board where the surfaces of the boards are above room temperature. The amount of the non-adhesive material extending below the adhesive layer needs to be only sufficient to prevent initial contact of the adhesive layer with the chalk or erase board.

Figure 5:
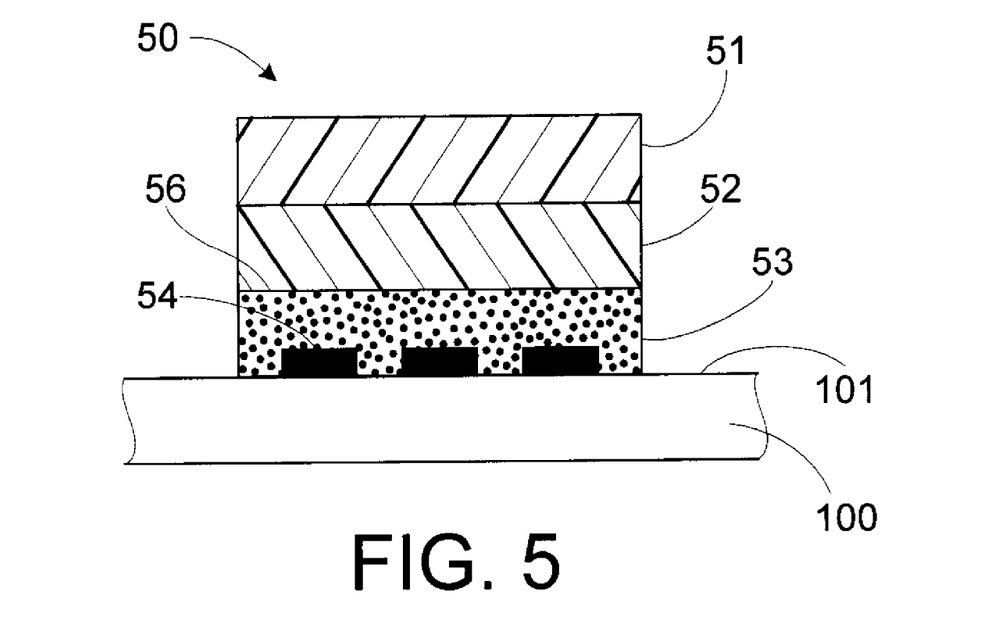
FIG. 5 is a cross sectional view of the multilayer film such as illustrated in FIG. 2b adhered to a substrate such as a blackboard.

FIG. 5 illustrates the multilayer film described above adhered to a substrate such as a chalk board or erase board. The multilayer film 50 comprises a clear dry erase film 51, an opaque polymer film 52 wherein the upper surface of the opaque film 52 is in contact with the lower surface of the dry erase film 51, and a continuous adhesive layer 53 in contact with the lower surface of the opaque layer 56. Non-adhesive material forms 54 are embedded in the lower surface of the adhesive layer 53. The multilayer film 50 is adhered to the substrate 58 by applying the multilayer film to the face of the chalk or erase board 58 with the lower surface of the adhesive layer 53 in contact with the face side of the chalk or dry erase board. Although FIG. 5 illustrates the dry erase boards of the present invention utilizing the multilayer film of FIG. 2b, similar dry erase boards can be prepared utilizing the multilayer films illustrated in FIGS. 1a, 1b, 2a, 2b, 2c, 2d, 3 and 4, and other multilayer films as described elsewhere in the specification.

While the invention has been explained in relation to its various embodiments, it is to be understood that other modifications thereof will become apparent to those skilled in the art upon reading the specification. Therefore, it is to be understood that the invention disclosed herein is intended to cover such modifications as fall within the scope of the appended claims.

The invention claimed is:

1. A dry erase writing board comprising;
   (A) a chalk or erase board having a face side, and
   (B) a multilayer film comprising
      (B-1) a clear dry erasable layer having an upper surface and a lower surface and comprising at least one fluorocarbon polymer the clear dry erasable layer having a thickness ranging from about 0.2 to about 3 mils;
      (B-2) an opaque polymer film having a thickness ranging from about 1 to about 6 mils and having an upper surface and a lower surface wherein the upper surface of an opaque polymer film is laminated to the lower surface of the dry erasable layer;
      (B-3) a continuous layer of an adhesive having a coat weight ranging from 10 to about 30 gsm and a thickness between 0.5 to about 5 mils and the continuous layer having an upper surface and a lower surface wherein the upper surface of the adhesive layer is adhered to the lower surface of the opaque polymer film; and
      (B-4) a pattern of non-adhesive material forms which is
         (B-4a) embedded into the upper surface of the adhesive layer, each of said non-adhesive material forms in the upper surface of the adhesive layer having a top surface wherein the top surfaces of the non-adhesive material forms are even with or below the plane of the upper surface of the adhesive layer; or
         (B-4b) embedded into the lower surface of the adhesive layer, each of said non-adhesive material forms in the lower surface of the adhesive layer having a bottom surface, wherein the bottom surfaces of the non-adhesive material forms are either even with, above or below the plane of the lower surface of the adhesive layer; or
         (B-4c) adhered to the lower surface of the adhesive layer; wherein the lower surface of the adhesive layer of the multilayer film (B) is adhered to the face side of the chalk or dry erase board.

2. The writing board of claim 1 wherein the opaque polymer film (B-2) is a white pigmented opaque polymer film.

3. The writing board of claim 1 wherein the pattern of non-adhesive material forms comprises a plurality of intersecting lines.

4. The writing board of claim 1 wherein the pattern of non-adhesive material forms comprises a plurality of parallel lines.

5. The writing board of claim 1 wherein the pattern of non-adhesive material forms comprises a plurality of dots, lines, or combinations thereof.

6. The writing board of claim 1 wherein the non-adhesive material comprises a UV curable ink.

7. The writing board of claim 1 wherein the pattern of non-adhesive material forms comprises lines and at least 50% of the lines intersect the end edges of the adhesive layer.

8. The writing board of claim 1 wherein the pattern of non-adhesive material forms comprises lines which form a grid pattern.

9. The writing board of claim 1 wherein the pattern of non-adhesive material forms adheres to the lower surface of the adhesive layer and comprises dots, lines, and combinations thereof.

10. The writing board of claim 1 wherein the adhesive layer comprises a pressure sensitive adhesive.

11. The writing board of claim 1 further comprising a print layer disposed on at least a portion of the upper surface of the opaque polymer film.

12. The writing board of claim 1, wherein one of the upper or lower surface layers of the adhesive has a Sheffield roughness of at least 10.

* * * * *

UNITED STATES PATENT AND TRADEMARK OFFICE
CERTIFICATE OF CORRECTION

PATENT NO. : 7,713,375 B2  
APPLICATION NO. : 11/468808  
DATED : May 11, 2010  
INVENTOR(S) : Robert W. Schneider Page 1 of 1

It is certified that error appears in the above-identified patent and that said Letters Patent is hereby corrected as shown below:

Column 15, line 26, please delete "substrate 58", and insert therefor --substrate 100--.

Column 15, line 26, after "face", please insert --side 101--.

Column 15, line 27, please delete "erase board 58", and insert therefor --erase board 100--.

Column 15, line 26, after "face side", please insert --101--.

Signed and Sealed this
Twenty-first Day of August, 2012

David J. Kappos
*Director of the United States Patent and Trademark Office*